May 21, 1957 K. W. COUSE 2,793,067
SUPER-EXPANSIBLE VEHICULAR BODY
Filed Aug. 3, 1954 11 Sheets-Sheet 4
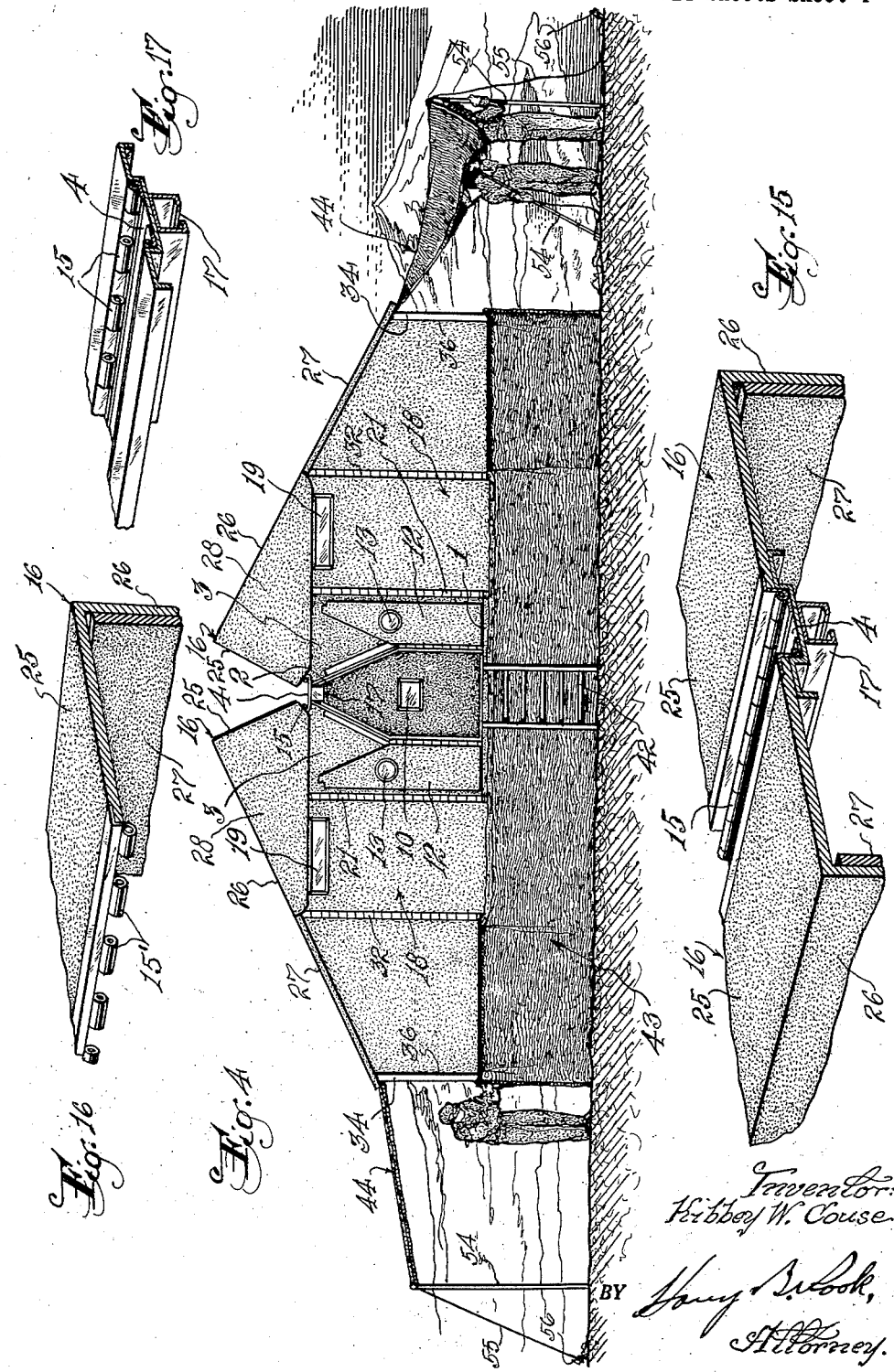

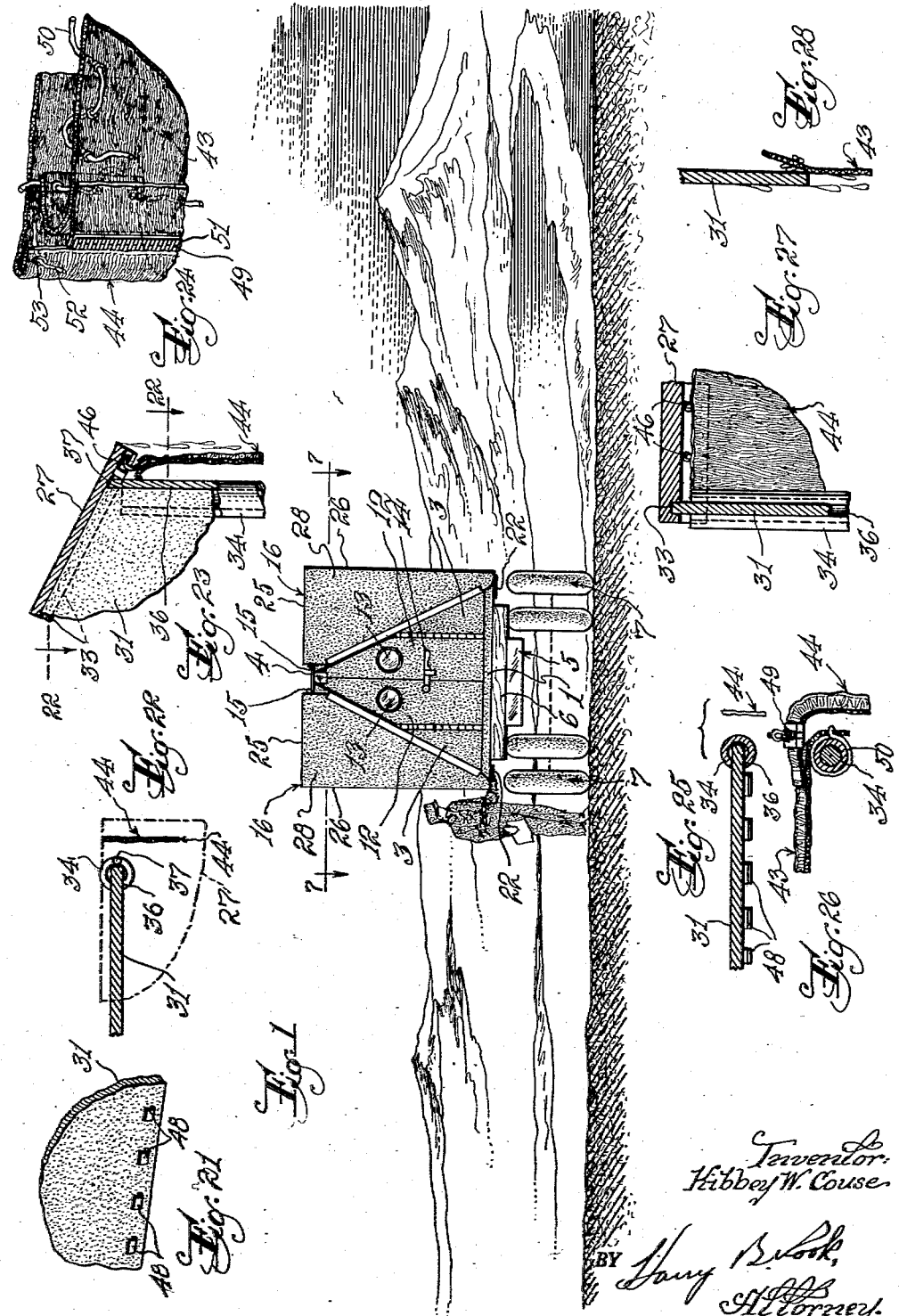

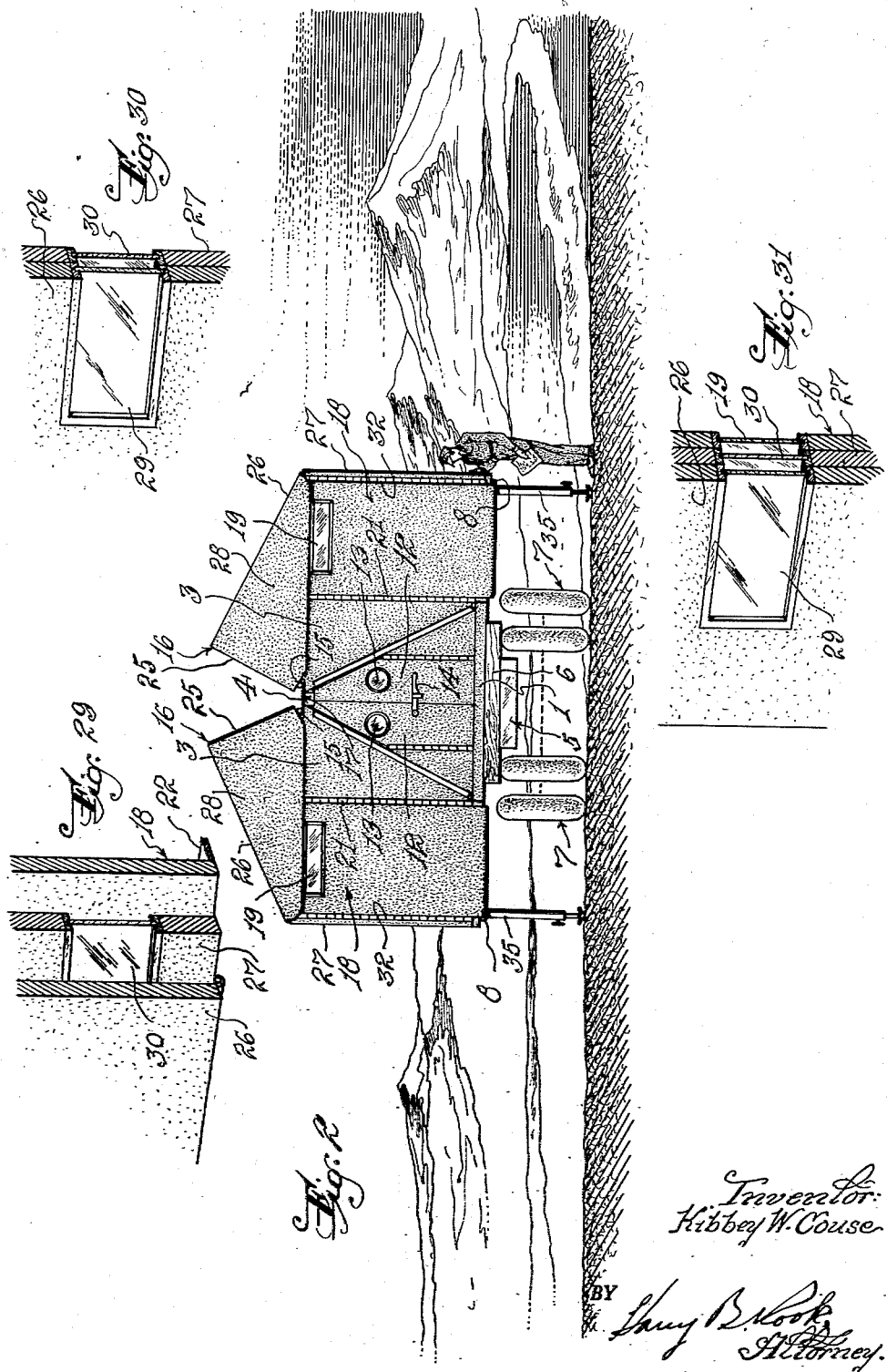

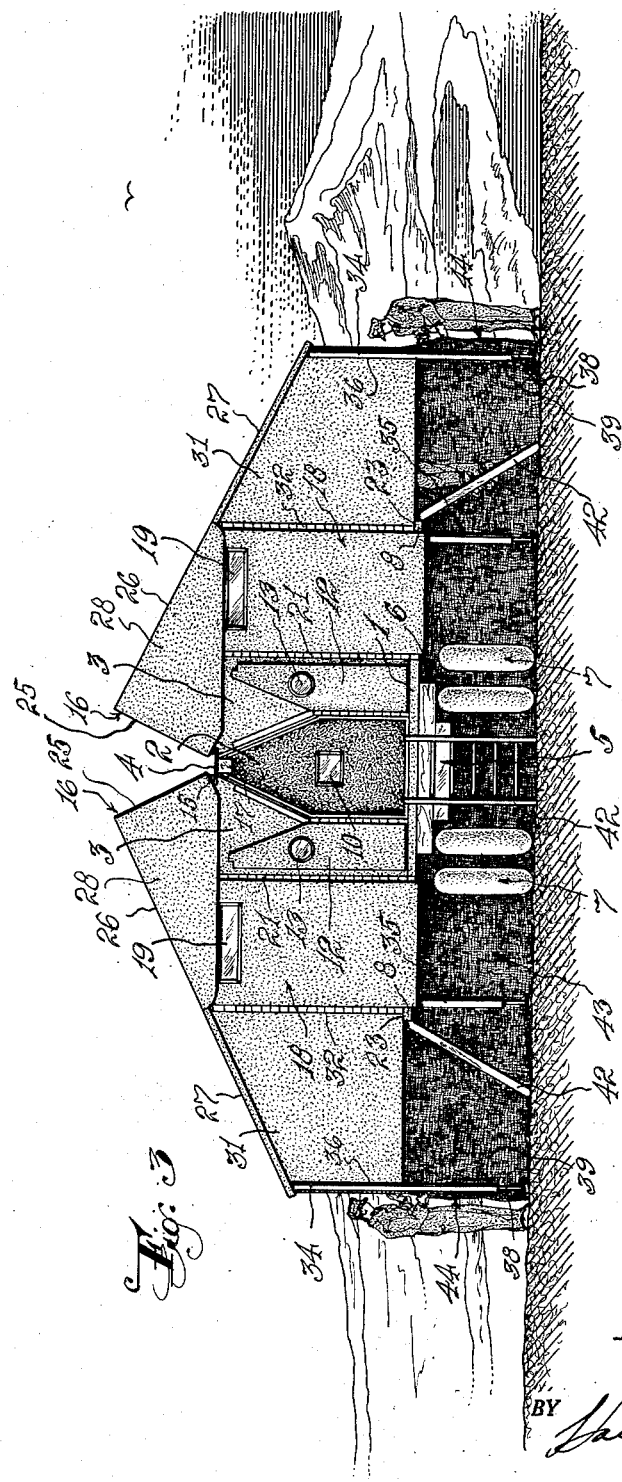

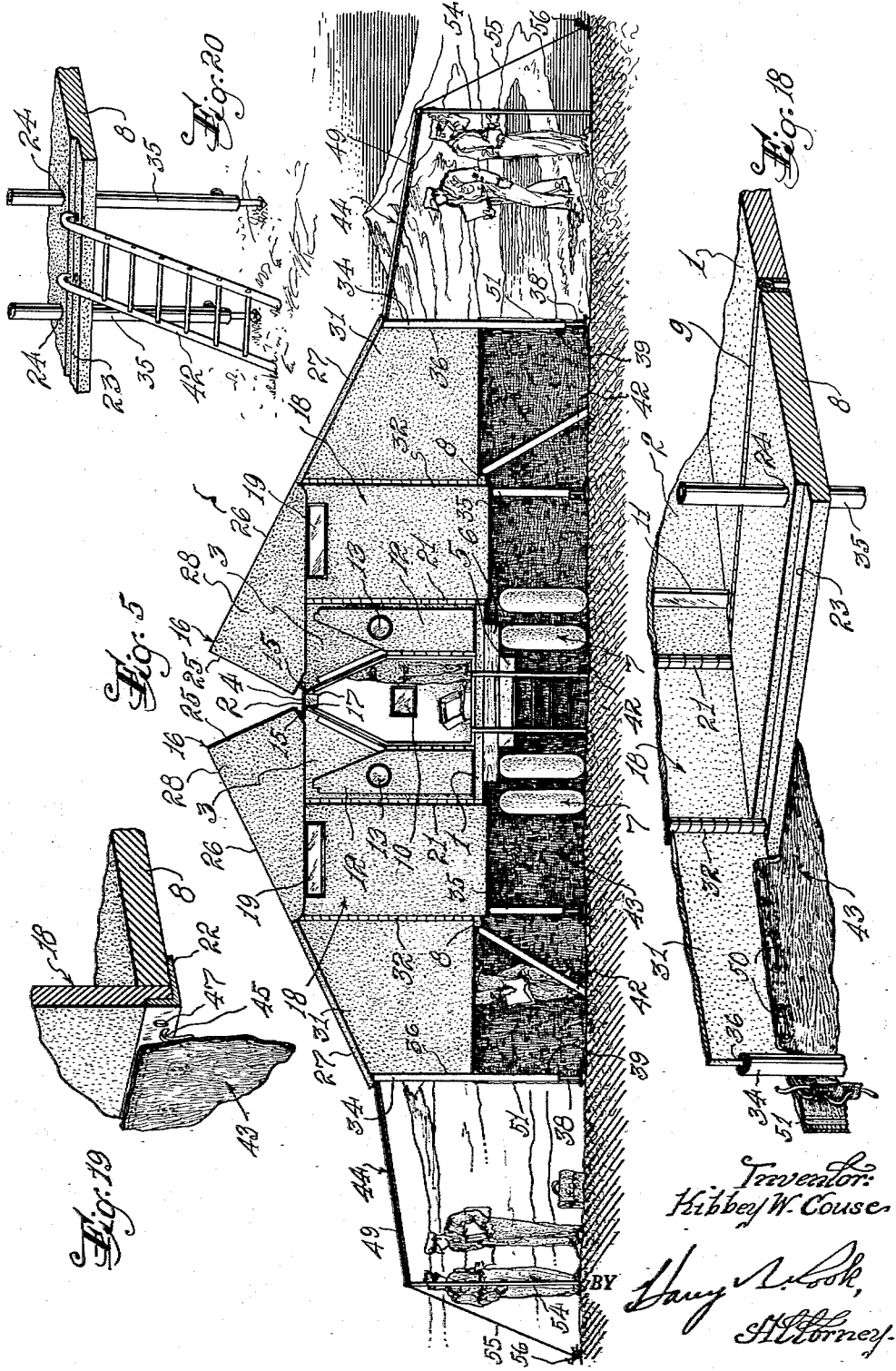

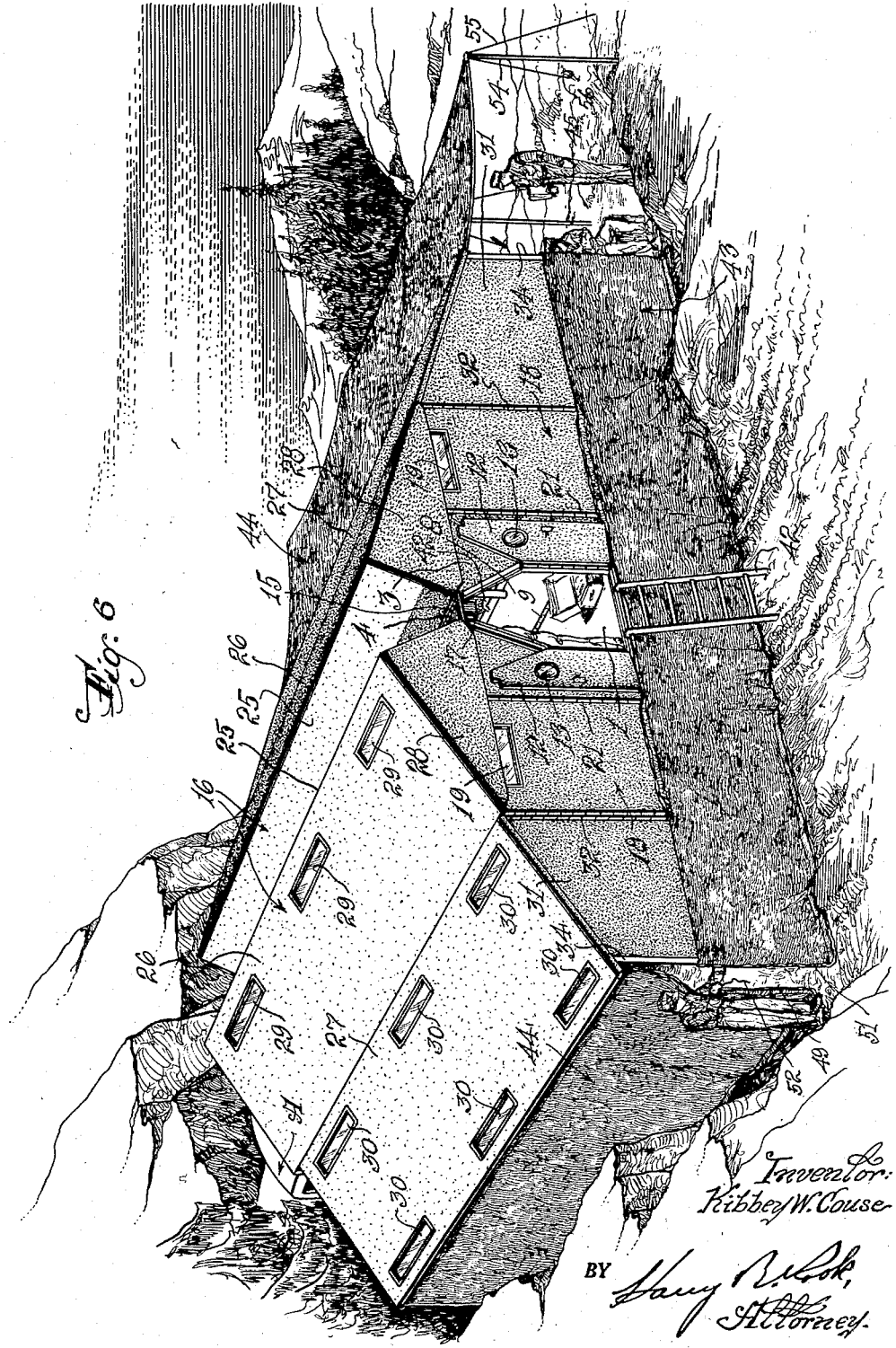

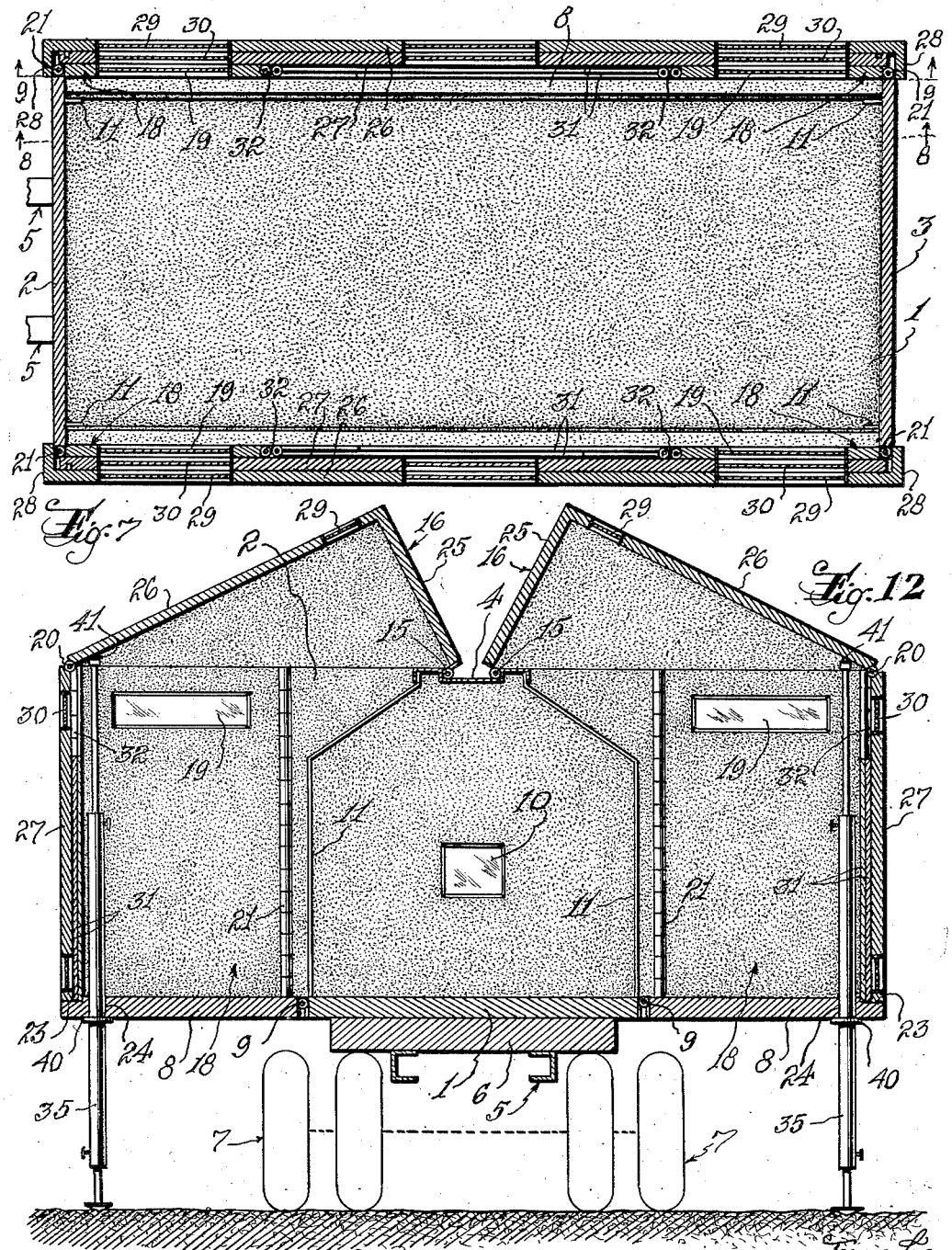

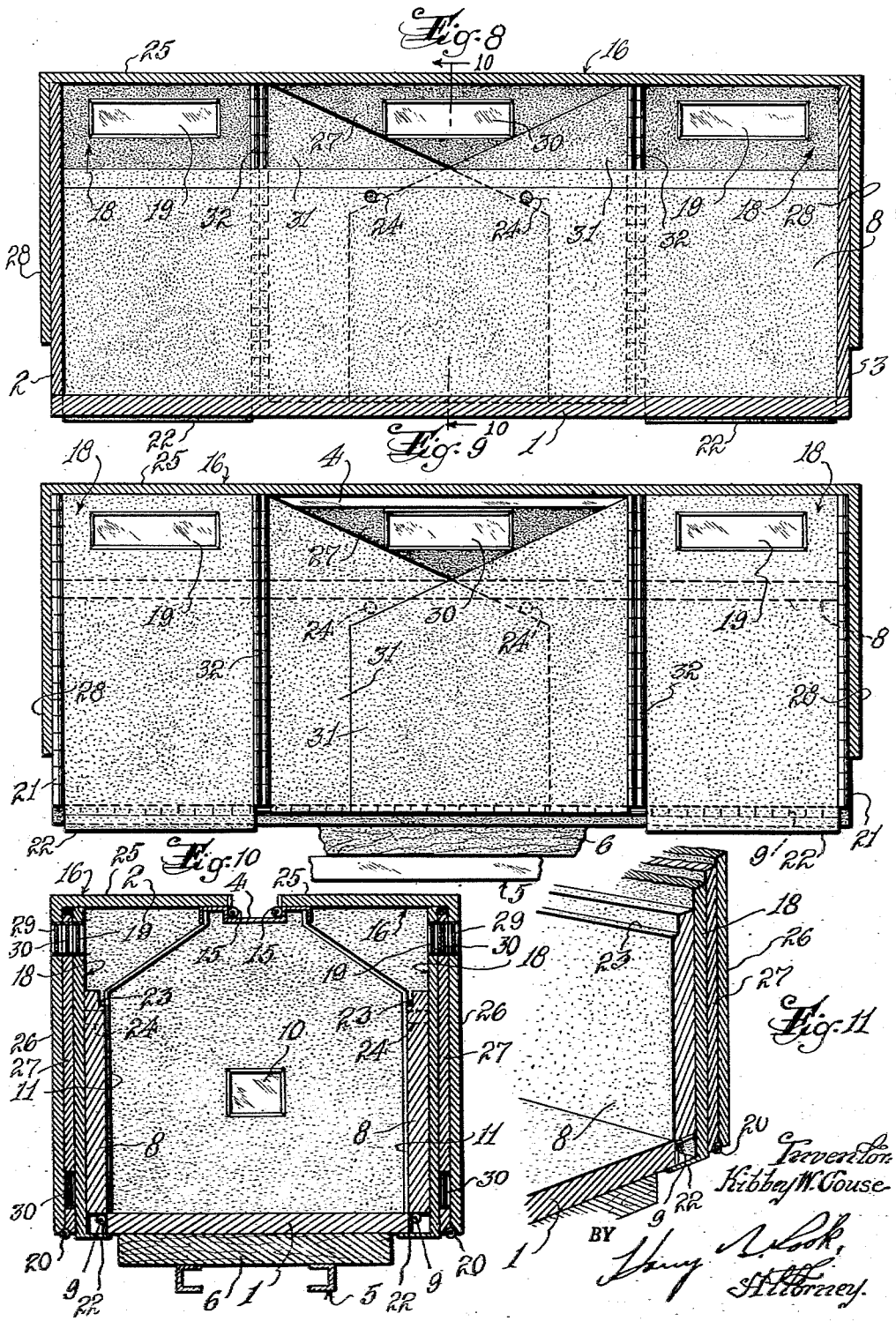

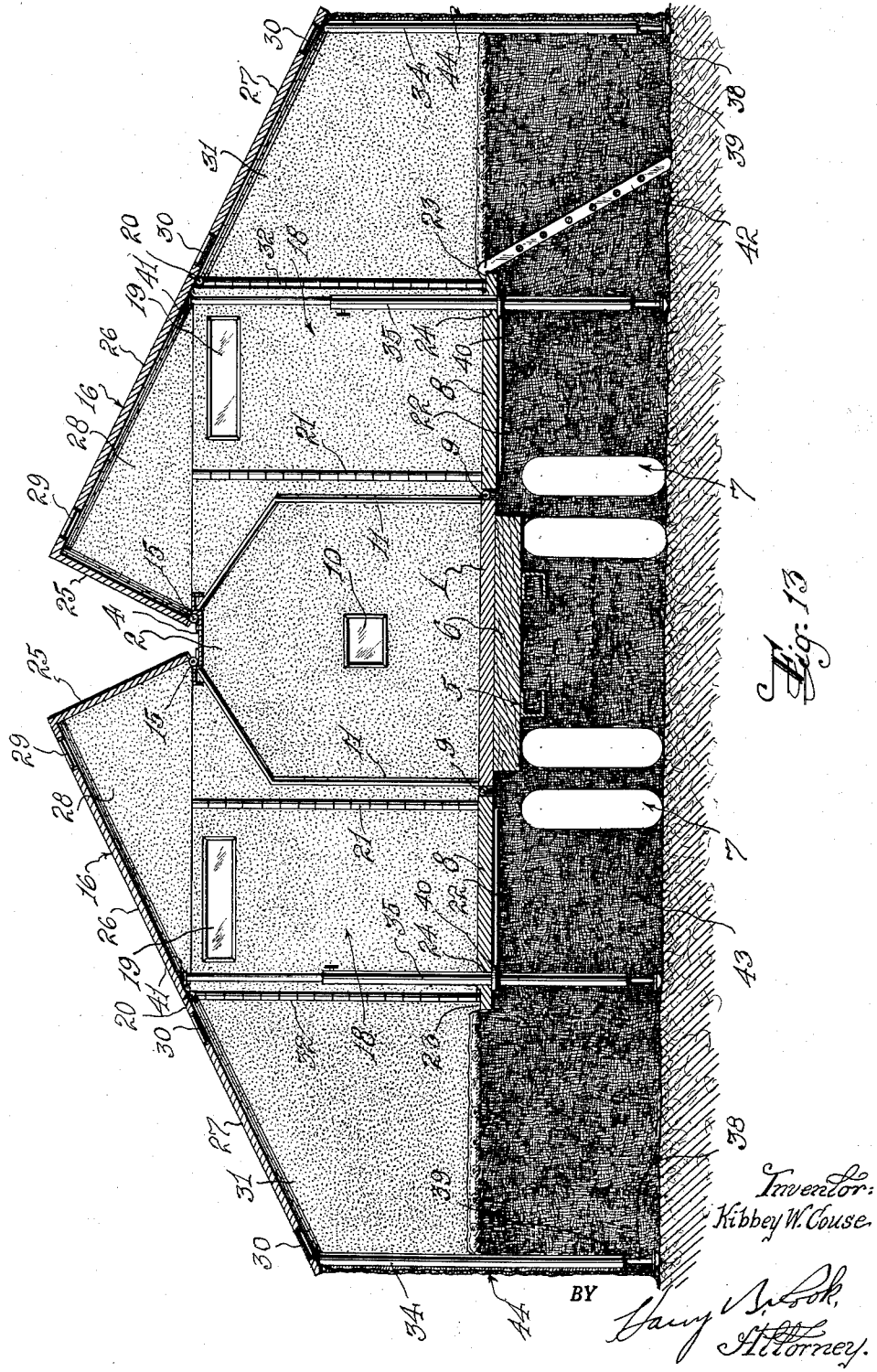

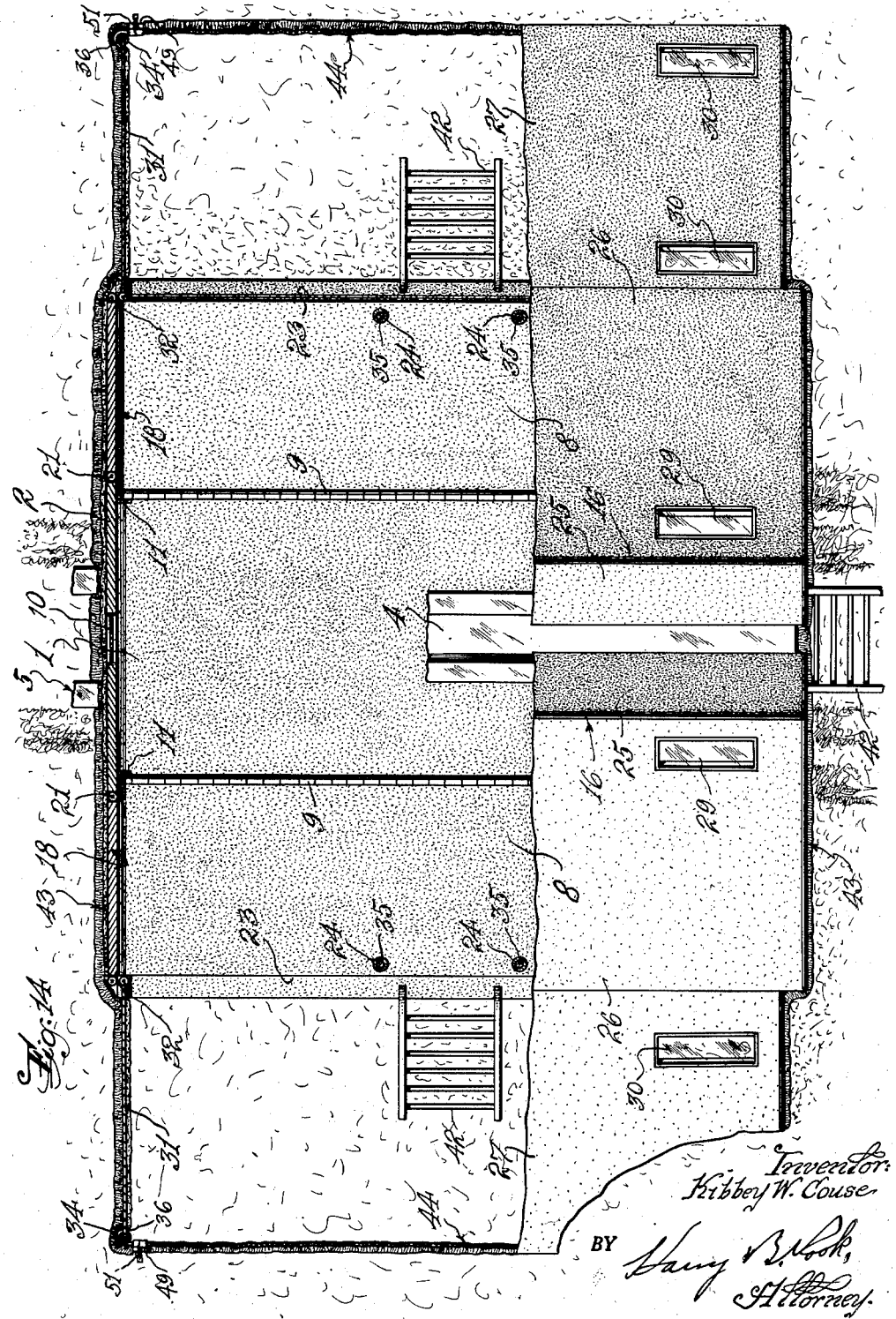

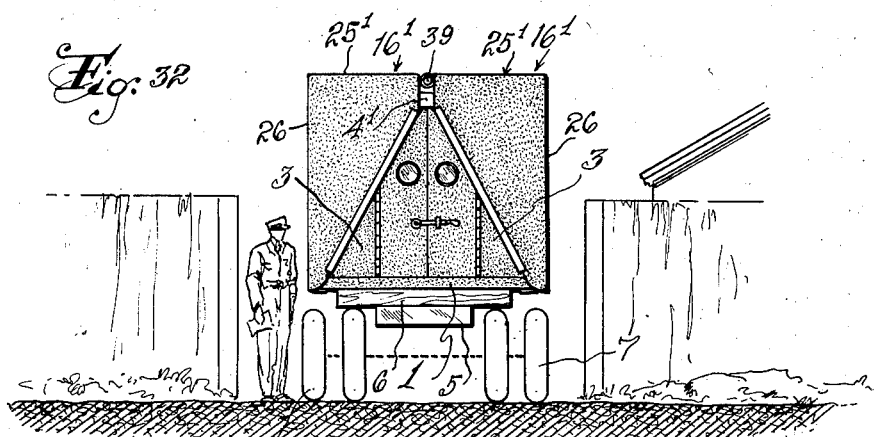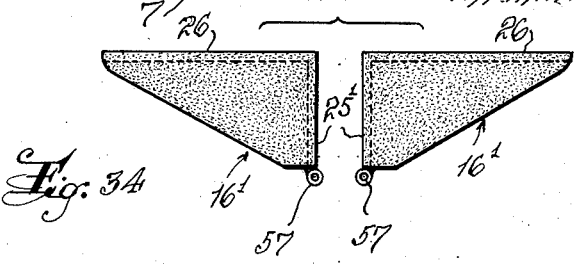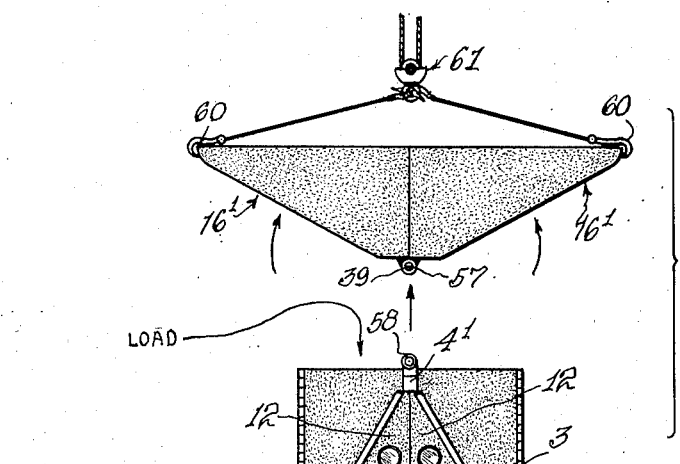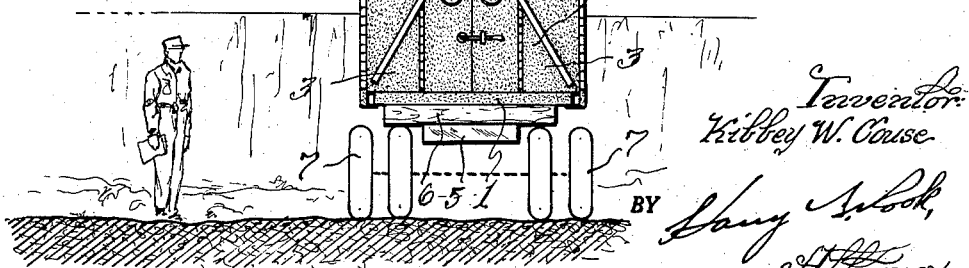

United States Patent Office 2,793,067
Patented May 21, 1957

2,793,067

SUPER-EXPANSIBLE VEHICULAR BODY

Kibbey W. Couse, Newark, N. J.

Application August 3, 1954, Serial No. 447,453

9 Claims. (Cl. 296—23)

My invention relates generally to vehicular bodies and more particularly to an expansible structure adapted to form the body of a conventional automobile truck, which structure can be converted into a body having numerous uses, such as a briefing depot, a machine shop, a field headquarters and the like.

The usual type of expansible truck body is composed of heterogeneous units, such as extensible sides, floor and roof sections which, when expanded, are fastened together with complicated flexible sealing flaps which are difficult to attach and which do not seal properly. Furthermore, the sliding floor sections are apt to get out of alignment and bind and are ill-adapted to support weight in extended position. Moreover, the usual expandable truck body, when in unexpanded condition, cannot make use of features hidden in that condition which may be distinctive in the expanded condition of the body and vice versa. It is also usual for windows, which are of paramount importance in the truck body proper, to function only when the body is expanded, and to be sealed off when the body is unexpanded, due to overlapping of some parts of the body.

It is the primary object of the present invention to provide an expansible truck body which eliminates the aforesaid disadvantages of the usual expansible truck body.

The present invention contemplates an expansible and convertible body having structural advantaged in its unexpanded condition which remain in the body when the body is expanded, and furthermore contemplates an expansible body wherein every advantage present in one condition of the body is designed to be of advantage in another converted condition. For example, a structural unit or section constructed as a floor area in the body when unexpanded remains a bona fide floor area in the body when expanded, and is used as such, as well as providing added floor area. The same is true of the units or sections constituting the roof, side and front and rear end areas.

Furthermore, the present invention contemplates an expansible body construction adaptable to three conditions of use: to wit, first, the normal folded or unexpanded condition or road condition, for traveling; secondly, the expanded condition; and thirdly, the super-expanded condition.

In the folded or unexpanded condition, the improved body conforms to a normal unexpanded truck body of required length, width and height for the road.

In the normal expanded condition, the improved body is expanded to the usual extreme expansion of a normal expanded body but has a bona fide nonflexible floor, sides, roof and front and rear ends automatically sealed against climatic conditions.

In the super-expanded condition, the improved body far exceeds in width area any expansible truck body now existent and, by means of simple flexible closures, seals off the added areas of the sides and ends. The entire roof area and the front and rear end areas are composed of nonflexible units or sections.

There is, however, a potential fourth condition inherent in the expansible body embodying the present invention which adds more width to the body beyond the condition of super-expansion. This condition is produced by providing and raising outer flexible side flaps whereby a flexible roof area results which is high enough to permit upright walking. This added area may be enclosed with insect netting, if desired, and constitutes also a large shielded entrance and exit.

An important feature of the present invention is the provision of double and triple window constructions which provide front and rear windows and skylights where most needed, and by the normal process of setting up the super-expanded construction provides windows where none existed before such superexpansion. The improved folded expansible body has three windows to a side, and sight windows front and rear. When super-expanded, the improved body has nine skylights or windows on each side of the center line of the body, and three windows in the front and four in the rear. In the normal expanded condition of the body, there are three skylight windows on each side of the center line of the body, three windows on each side proper, and three windows in the front and four in the rear.

Not only is the provision of additional windows a novel feature, but their arrangement whereby the windows assume new and advantageous positions when the body is changed from unexpanded to expanded to super-expanded positions is also a novel feature. By this arrangement, the windows neither appear when they are not needed nor disappear when they are needed most.

Another object of the present invention is to provide an expansible truck body wherein the windows are so constructed and arranged that advantages result therefrom in all conditions of the body, that is, in the folded or unexpanded condition, in the normal expanded condition and in the super-expanded condition.

Another object of the invention is to provide an expansible and convertible truck body having expansible sides coacting with adjustable supporting posts whereby suitable and sufficient support throughout the entire structure is afforded.

Another object of the invention is to provide an expansible truck body with adjustable sides whereby one side may be expanded and the other side superexpanded in order to equalize for unusual ground contours.

Another object of the invention is to provide an expansible truck body with canvas end skirts and canvas side drops which are simple in design, easily attached and detached and provide ample protection in use.

Another object of the invention is to provide an expansible truck body wherein the folding panels or sections are automatically interlocked and provide self-sealing.

Another object of the invention is to provide an expansible truck body with adjustable body supports extending from the ground to the roof to afford suitable and sufficient support for the body.

It is further proposed to provide an expansible truck body which is adapted to be mounted on a standard automobile chassis frame, which is adapted to meet all the requirements of the road as to height, width and overall length, which constitutes a separate unit for all intents and purposes, and which is of such construction that it can quickly be attached to or detached from the automobile chassis frame.

Another object of the invention is to provide an expansible truck body which is adapted to be expanded while mounted on the automobile chassis frame and when so expanded relieves the chassis frame of the strain of excessive torque due to the redistribution of weight caused by the expanded condition.

Another object of the invention is to provide an expansible truck body having a number of movable elements which perform more than one function, each of which elements performs an active part in both the expanded and the unexpanded conditions of the body.

Other objects and advantages of the present invention are to provide an expansible truck body which is sturdy and is adapted to the climate and to varied purposes to which it is put, which affords suitable and sufficient space inside the body when folded and large floor and roof areas when expanded, which is capable of semi-expansion such as is required by unusual terrain contour or when it is desired to have one side of the body folded and the other side expanded, semi or full, and which is provided with suitable and sufficient entrances when folded or expanded.

It is further proposed according to a modification of the invention to provide an expansible truck body with a removable roof in order to facilitate loading the truck body from the top.

Other objects and advantages of the invention will be apparent from the description thereof to follow taken in connection with the accompanying drawing in which—

Figure 1 is a rear elevational view of an expansible truck body embodying one form of my invention shown in folded road condition.

Figure 2 is a view similar to Figure 1 but showing the truck body normally expanded.

Figure 3 is a view similar to Figure 1 but showing the truck body in superexpanded condition, parts being shown in open position and parts being omitted for the sake of clearness.

Figure 4 is a view similar to Figure 3 but showing all parts in position and with parts shown extended.

Figure 5 is a view similar to Figure 4 but showing the rear canvas skirt omitted for the sake of clearness.

Figure 6 is a perspective view of the expansible truck body of Figure 1 in super-expanded condition, the rear doors being shown in open position and one side flap being shown in lowered position.

Figure 7 is an enlarged sectional view taken on the plane of the line 7—7 of Figure 1.

Figure 8 is a vertical sectional view taken on the plane of the line 8—8 of Figure 7.

Figure 9 is a vertical sectional view taken on the plane of the line 9—9 of Figure 7.

Figure 10 is a vertical sectional view taken on the plane of the line 10—10 of Figure 8.

Figure 11 is an enlarged fragmentary perspective view, in section, showing the lower right hand corner of Figure 10.

Figure 12 is a sectional view similar to Figure 10 but showing the truck body in normally expanded condition.

Figure 13 is a sectional view similar to Figure 12 but showing the truck body in superexpanded condition, the rear canvas skirt being omitted for the sake of clearness.

Figure 14 is a part top plan and part horizontal sectional view of the superexpanded truck body of Figure 3 on an enlarged scale.

Figure 15 is a fragmentary perspective view in section showing the folding roof units and the hinged support therefor.

Figure 16 is a fragmentary perspective view in section of a roof unit.

Figure 17 is a fragmentary perspective view of the ridge member for joining the front and rear bulkheads.

Figure 18 is a fragmentary perspective view of a catwalk and associated parts.

Figure 19 is a fragmentary perspective view showing the method of attaching a canvas skirt to a folding panel.

Figure 20 is a fragmentary perspective view showing the outer edge of a catwalk supported on posts and a ladder in operative position.

Figure 21 is a fragmentary perspective view of a superexpanding side panel with canvas skirt attaching lugs thereon.

Figure 22 is a sectional detail view taken approximately on the plane of the line 22—22 of Figure 23.

Figure 23 is a sectional detail view showing the method of connecting a superexpanding side panel to its supporting post.

Figure 24 is a fragmentary perspective view showing the zipper fastening means for connecting a canvas side flap to a canvas end skirt.

Figure 25 is a fragmentary sectional detail view of a superexpanding side panel with lugs for attaching a canvas skirt thereto.

Figure 26 is a fragmentary sectional detail view of the zipper means for fastening the adjacent end edges of a canvas end skirt and a canvas side flap.

Figure 27 is a fragmentary sectional detail view of a joint between a folding roof panel and a folding superexpanding side panel.

Figure 28 is a fragmentary sectional detail view of a joint between a folding superexpanding side panel and its associated canvas skirt.

Figures 29, 30 and 31 are fragmentary perspective detail views, in section, showing single, double and triple window arrangements, respectively, when the truck body is in folded road condition.

Figure 32 is a view similar to Figure 1 but showing a modification of the invention.

Figure 33 is a view similar to Figure 32 but showing the roof units lifted off of the truck body by a lifting hoist.

Figure 34 is an end elevational view of the roof units of Figure 32 removed from the truck body and separated from each other.

The superexpansible truck body of the present invention is preferably constructed of 2" insulated body units or sections throughout except for the floor area which is preferably 4" thick, and the superexpanding side panels or sections which are each slightly less than 1" thick.

Referring to the drawings in detail, the expansible truck body made in accordance with the present invention is shown mounted on a conventional automobile A. The truck body is composed of a fixed floor panel 1 and fixed front and rear bulkheads 2 and 3, respectively, which are joined together at their upper ends by a roof supporting ridge member or support 4. The floor, front and rear bulkheads and ridge member or support form the general foundation unit of the truck body. In order to permit the truck body to be firmly and quickly fastened to the chassis frame, indicated generally at 5, the chassis frame is provided with a bed plate 6 fixedly fastened to the chassis frame and to which the floor panel is bolted. The chassis frame is supported on road wheels shown diagrammatically at 7. This construction permits the entire truck body to be lifted free of the chassis frame for shipment or for any other purpose. Floor-extension panels 8 constituting catwalks are attached to each side of the floor panel 1 by hinges 9, and when the truck body is in normal folded condition said catwalks form semi-side members which extend from bulkhead to bulkhead at right angles to the floor panel.

The floor panel and catwalks are each preferably 4" thick, and the bulkheads are preferably 2" thick each. The front bulkhead 2 is provided with a cab-view window 10 and stop flanges 11 against which the catwalks rest when in folded position. The rear bulkhead 3 is provided with folding entrance doors 12, each of which has a window 13. The doors are also provided with a locking device 14. The doors are also notched at their upper ends for a purpose which will appear later.

It will be noted that the hinged edges of the floor panel and the floor-extension panels or catwalks are hinged in such a manner that they exactly abut each other when in folded position and do not overlie. When the catwalks 8 are folded outwardly into extended position, the floor panel 1 and the catwalks are on a common plane and flush with each other, the hinges filling in the space created by the changed position of the catwalks. It will be seen that because the floor panel 1 and the catwalks 8 are of equal thickness together, they provide a flat and equally strong composite floor area and that when the catwalks are folded up, very rigid side walls preferably 4" thick each result.

The roof ridge member or support 4 is in the form of a short "Wall of Troy" section and not only acts as a ridge member between the bulkheads but also forms a firm base member for the hinge knuckles or units 15 to which the roof units 16, 16 are securely attached. The units 16, 16 constitute the roof or top construction of the truck body. The ridge member 4 also slidably mounts a split tubular crane supporting member 17 which may be extended rearward out through the notches in the upper ends of the rear doors 12, but which in normal position is retracted within the confines of the body proper.

Hinged upon and at either side of each of the front and rear bulkheads 2 and 3, respectively, there are swinging main bulkhead-extension panels 18, each of which is provided with a window 19 at its upper end which coacts with other windows so as to form double and triple composite windows as will be later explained. These panels 18 are preferably 2" in thickness, or one-half the thickness of the floor panel 1 and of the catwalks 8. The panels 18 are fastened to each of the bulkheads 2 and 3 by simple hinges 21, which permit the panels 18 to be swung inwardly and allow them to fit tightly against the outer surfaces of the catwalks 8 when both the catwalks 8 and the panels 18 are unexpanded in normal road condition. The panels 18 at their upper ends are flush with the upper margins of the bulkheads 2 and 3 and their lower ends are flush with the plane of the bottom surface of the floor panel 1. The panels 18 have sealing strips or lips 22 (Fig. 19) extending underneath the hinged areas of the floor panel 1 and the catwalks 8, sealing these areas against moisture, dirt and climatic changes. When the truck body is expanded, these strips not only seal but form supports for the front and rear portions of the catwalks 8.

It will be seen from the above description that almost all of the movable units of the truck body perform more than one function; each function being an important feature either in one position of the unit or in another; each unit playing an active part in both expanded and unexpanded positions of the truck body. Thus a movable unit does not aid in one position and hinder in another.

The bulkhead extension panels 18, in area, are each about one-half of the total of the bulkheads 2 and 3 and one-quarter of the width of the entire length of the truck body overall. This ratio, with regard to the bulkheads 2 and 3, remains approximately constant even when the truck body is converted into a slightly larger or smaller machine shop or the like. The panels 18 and catwalks 8 form a reinforcing area for the truck body, amounting to about one-half of its vertical height when in normal road condition and for its entire overall length. The catwalks 8 are of such width that they are more than one-half the width of the bulkheads 2 and 3 and extend, when expanded, beyond the outer margins of the panels 18. This construction permits the long outer edges of the catwalks to be reduced in thickness and form long shoulders 23 (Fig. 20), the purposes of these reduced areas and shoulders being later herein set forth. The catwalks are each provided with spaced holes 24, the purpose of which will later be described.

The roof or top construction of the truck body is an important feature of the present invention and comprises two roof units 16 each of which comprises a panel having a short section 25 and an integral long section 26 right angularly related to the short section. Spaced hinged knuckles 15' (Fig. 16) are supported on the elongated free edge of each short section 25 for coacting with the adjacent row of spaced hinge knuckles 15 on the ridge member 4 and with the usual hinge pin. A roof extension panel 27 is attached to the outer margin of each long section 26 by a hinge 20 (Fig. 13). The panel is normally folded inside or behind the long section 26. When the truck body is in normal road condition as shown in Figure 1, the short sections 25 form the roof proper and the long sections 26 together with the folded panels 27 form the enclosing sides for the body. The panels 27 may be swung outwardly and into alignment with the long sections 26 of the roof units, forming prolongations thereof and thus extend the roof construction to a greater overall width. The roof units proper are hinged, as heretofore described, upon the ridge member 4 and extend slightly beyond the outer ends of the ridge member and of the bulkheads 2 and 3. Each roof unit 16 is also provided with front and rear triangular integral end wall sections 28, which, in road condition, overlap the upper parts of the bulkheads 2 and 3, and seal the four vertical edges of the body as shown in Figure 1. The short sections 25 of the roof units 16 together with the intervening area of the ridge member 4 form in road condition a flat top area which is well sealed and constitutes the overall area of the body in plan.

Each roof unit 16 preferably is 2" thick and its inner folding roof extension panel 27 is also preferably 2" thick and when normally folded inwardly against the inner face of the long section 26 of the roof unit increases this area's thickness 2" and also increases the thickness of the side wall, of which it forms a part when the roof unit is in normal lowered or unexpanded road condition. The long roof sections 26 and their inner folding panels 27 are provided with windows 29 and 30, respectively; the long sections 26 each having three windows 29, and the inner folding panels 27 each having six windows, three along the hinged edge of each and three along its opposite edge, the latter three windows 30 being disposed in alignment with the three windows 29 in the adjacent long section 26 when the roof unit is in folded or road condition, while the other three windows 30 adjacent the hinge line of each folding panel 27 are blanked off. The provision of these windows in the long sections and in the panels and their position and number are important features of the present invention. The windows in the hinged panels 27 and in the long roof sections 26 are in alignment under road condition and provide light, ventilation and visibility inside the truck body.

Each roof unit 16 is designed to function in three positions, to wit, closed, expanded and super-expanded and is capable of supporting a heavy weight in either normal road condition or expanded condition and of supporting considerable weight in the super-expanded condition. In either road, expanded or super-expanded condition, each roof unit 16 is at all times preferably 2" thick in all roof areas.

Although the truck body composed of the units including the floor 1, catwalks 8, front and rear bulkheads 2 and 3, respectively, ridge member 4, roof units 16, with panels 27, will expand to the limit of truck body expansion now common to the art, the super-expansible truck body made in accordance with the present invention is not confined to these limits but is capable of further or super-expansion due to the provision of special comparatively thin double-hinge mounted auxiliary bulkhead-extension panels 31, the arrangement, mounting and construction of which and their coacting parts constitute a step far in advance of any yet taken in this field of body construction. These panels 31, of which there are four in number, are attached to the outer vertical margins of panels 18 by double hinges 32, one part of the double hinge being fixedly attached to the edge of its supporting panel 18 and its other part being attached to the adjacent panel 31 yet is free to pivot about the axis of the fixed axis of the hinge part attached to panel 18. The adjacent panel 31 is thus capable of using the fixed axis as a pivot, or of swinging upon a movable axis. With this construction, the panels 31 each may be swung so that its major plane is at right angles to the major plane of the adjacent panel 18 or in line therewith, or again on the same plane as panel 18 but offset, or still again, at right angles to panel 18, but with either of the two pivots in line with the plane of the panel 31, or with one offset with respect to this plane.

The super-expanding panels 31 are of such a width, when both panels 18 and 31 are folded in road condition, that the free edge of each panel 31 extends beyond the transverse center line of the truck body and the unattached areas of each companion panel 31 are on the same side of the body. The lower free edges of panels 31 rest upon and are supported by the reduced outer edges of the catwalks 8. The panels 31 are beveled downwardly, from their tops, at hinged ends, to their free ends, so that at the center point of the truck body side where they lap and overlie each other, they are about two-thirds the total height of the truck body from the edges of the catwalks 8 to the upper edges of the bulkheads 2 and 3. It will be noted from the drawings that when the panels 18 are folded into road condition and rest against the outer sides of the catwalks 8 as shown in Figures 7 and 10, there is a space left between the ends of the panels 18 and between the panels 27 and the full 4" catwalks. The panels 31 being about 1" thick nest within this space which preferably is 2", and the two panels together being preferably somewht less than 2" thick, any adjustment required to lap the panels 31 and nest them is taken care of by the hinges 32. When the body is in its expanded condition (Fig. 12) the lower edges of the panels 18 seat in the reduced areas 23 at the outer edges of the catwalks and between the roof extension panels 27 and the shoulders formed by said reduced areas.

The super-expanding panels 31, as before stated, may be opened outwardly into alignment with the bulkheads 2 and 3 and with the panels 18 when extended. It is in this position that the panels 31 permit the truck body to be super-expanded. In this position, the upper inclined edges of the panels 31 are ready to aid in supporting the under surfaces of the inner folding roof panels 27 when the latter panels are unfolded and extended into alignment with the long sections 26 of the roof units 16 to which they are hinged.

In order to provide supporting seats for the super-expanding panels 31, each panel 27 has a long, shallow groove 33 (Fig. 27) into which the upper edge of the adjacent panel 31 is inserted. This manner of joining the panels eliminates any chance of the panels 31 becoming out of proper alignment in offset position with respect to the panels 18, and at the same time firmly holds the panels 27 from twisting or becoming out of plumb. Due to the double hinges 32, the inner ends of the panels 31 will seat upon the reduced areas of the catwalks 8 and thus relieve the vertical strain upon the double hinges 32. The construction of each hinge 32 is such that it permits one pintle to be offset in order to place the panels 31 beneath the grooves 33 in the panels 27, which panels 27 must be less in length than the roof sections 26.

The truck body under road condition is supported as heretofore stated by the usual chassis frame 5 and road wheels 7 as in normal practice, but in either the expanded or super-expanded condition, additional support is needed. Such support must be adapted to be quickly positioned and have suitable strength so that after it is in place it will not interfere with the desired truck body uses. According to the present invention, this additional support comprises pairs of supporting members 34 and 35 (Fig. 18) designed to reinforce the truck body when the latter is expanded and to support the truck body when it is super-expanded. These pairs of supporting members 34 and 35 are in the form of hollow adjustable post-like or rod-like units, the posts 35 supporting the catwalks 8 and roof units 16, while the posts 34 are used to steady the panels 31 and to support the inner folding panels 27 of the roof units when the panels 31 are unfolded to produce the super-expanded roof area. Each supporting post 34 has its upper end slotted as indicated at 36 (Figure 22) to receive the free margin of the adjacent panel 31 and is provided with a small integral locking lug 37 which is inserted into a hole in the adjacent panel 27, or is nested in the outermost end portion of the groove 33 in panel 27 not occupied by the upper edge of panel 31. These posts 34 are adjustable and are made so by screw extensions 38 (Fig. 13) inserted into the bottom ends of the supporting posts 34 and locked by set screws 39. The posts 35 are of similar construction but are not slotted and are provided midway of their ends with circular flanges 40. These posts 35 have locking lugs 41 on their upper ends somewhat similar to those of posts 34 and have similar adjustable lower ends. The posts 35 are inserted through the holes 24 in the catwalks 8, the catwalks resting upon and being supported by the circular flanges 40 on the posts 35 as will be seen from Figure 13. The four posts 34 are positioned at the outer corners of the super-expanded truck body, one at each corner, while the four posts 35 are positioned two to a catwalk and placed one on each side of the short axis center line of the catwalk and spaced apart from each other a distance slightly greater than the width of a ladder 42 (Fig. 14) hooked onto the catwalk. The upper reaches of the posts 35 above the catwalk form suitable hand-holds when the ladder 42 is used.

It is desired to provide the truck body with at least three ladders 42, one for each side of the body and one for the rear entrance. The posts 34 also provide firm anchors to which canvas closures later to be described may be attached by cords or in any other suitable manner. All of the posts 34 and 35 may be quickly removed or put into place.

The expanded truck body does not need any flexible closure whatever, as the entire body preferably has walls at least 2" thick. The floor area 1, however, is preferably 4" thick. However, when the truck body is super-expanded, canvas closures 43 (Fig. 24) for the ends thereof and canvas closures 44 (Fig. 4) for the sides thereof are provided. The end canvas closures 43, each in the form of a skirt, are adapted to be quickly attached to the front and rear ends of the super-expanded truck body. The two end skirts 43 are identical except for the fact that the one used in front is slitted to permit it to be placed under and over the chassis frame 5. The rear skirt 43 is in one piece and is attached to the rear and beyond the end of the chassis frame. The end skirts 43 and the side closure flaps 44 have catch hooks 45 and 46, respectively, on their upper ends for attachment to the respective panels as is common in this type of canvas covering. The fastening of these closures, however, is done outside where the skirts 43 are attached to the bulkheads 2 and 3 and to the holes 47 in the panels 18, and is done inside where they are attached to lugs 48 on the super-expanding panels 31. Inasmuch as the truck body is automatically sealed along the bulkheads 2 and 3 and along the panels 18, outside attaching is efficient, but in the case of panels 31 the canvas skirts 43 are attached inside, thus permitting the rain, moisture and the like to run off of the panels 31 onto the outside of the canvas skirts as shown in Figure 28.

The sides of the super-expanded truck body or shop or the like are closed by the side canvas flaps 44 which are attached at their upper edges by the hooks 46 to the folding roof panels 27 beneath the outer edges thereof as shown in Figure 23. The flaps 44 provide drip-proof seals along the margins of the super-expanded body. As shown in Figure 24, the side end margins of each canvas flap or closure 44 are provided with zipper elements 49 in their lower reaches so as to attach such marginal areas to the side ends of the adjacent end skirt 43, which latter skirts are not only provided with cords 50 to tie them to the posts 34 but also with zipper elements 51 to coact with the zipper elements 49 on the canvas flaps 44. The upper marginal reaches of the flaps 44 have cord attachments 52 to secure them to the posts 34, and said flaps may have small eyelets 53 to coact with the cords. However, the upper fasteners may be dispensed with as the zipper fastener is fully efficient in sealing the flaps 44 along their margins. It will be seen that with the skirts 43 and side flaps 44 fixed in place, the super-expanded truck body is entirely enclosed, entrance and exit being made through the rear bulkhead doors 12. Ample, shielded ground room is provided by the ground space areas existing between the catwalks 8 and the canvas skirts 43 and flaps 44. The interior of the truck body is accessible by means of the ladders 42, and access to the ground area through the zippered areas which may be used as an entrance or exit.

As shown in Figure 4, the side flaps 44 can be unfastened and swung upwardly and outwardly and supported in this position on posts 54 and guy ropes 55 suitably attached to the flaps and to ground stakes 56 in order to form covered areas useable as shielded entrances and exits.

As described, the truck body when folded as shown in Figure 1 has ample inside space and is preferably sealed by front and rear walls each 2″ thick, a floor 4″ thick, side walls 10″ thick and a roof 2″ thick and yet with a lateral outside diameter cross-section of only 8′. The extensible body has ample light, provided preferably by nine windows; three large windows to a side, one in the front bulkhead 2 and two in the rear doors 12. In expanded condition, the expansible body preferably has front and rear walls, each 2″ thick, a floor 4″ thick, fixed side walls 4″ to 6″ thick, and a roof 2″ thick. In this condition, the window area consists of six slanted skylight windows, three on each side of the center of the roof ridge; six side windows, three to a side; three front windows, including two large windows, one on each side of the cab area and one small window, and four windows in the rear, two large windows on each side of the rear bulkhead 3 and one in each rear door 12.

The truck body in super-expanded condition has ample closure, preferably consisting of a floor area 4″ thick, a roof area 2″ thick, fixed front and rear wall areas each 2″ thick, with extended non-flexible walls each of about 1″ thickness, and an outer closure of sealed heavy canvas. It preferably has window area consisting of eighteen slanted skylight windows, nine on each side of the roof ridge, three front windows identical to those of the semi-expanded body and four rear windows also identical with those of the semi-expanded body. In this super-expanded condition of the body, the side flaps 44 may be raised to provide additional light and air.

In the drawing, Figure 1 shows the truck body in folded condition during transportation. When it is desired to stop and set up the truck body, a suitable location is found and the truck is extended to normal extended condition as shown in Figure 2 by merely unlocking the roof construction by raising both roof units 16, with the roof panels 27 in folded position, to a position spaced above the body proper of the truck. The panels 18 are next swung outwardly into line with their respective bulkheads 2 and 3, the double hinge constructions 32 permitting this action. Next the catwalks 8 are swung downwardly into line with the floor panel 1. The super-expanding panels 31 are then swung outwardly into line with the panels 18 as shown in Figure 3. The inner folding panels 27 are then unfolded and swung outwardly and upwardly until they are above and beyond the double hinges 32. Next the panels 31 are retracted or swung inwardly against the shoulders 23 of the catwalks 8 and the supporting posts 35 placed in position at the outer edges of panels 18. Finally the roof units 16 are lowered so that the lower edges of panels 27 rest upon the ledges formed by the cutaway edges of the catwalks 8. This completes the assembly of the expanded truck body construction shown in Figure 2 which is supported at all corners by the posts 35 and which is capable of a number of various uses.

From the expanded condition of the truck body just described and shown in Figure 2, the truck body may be further or super expanded by raising the roof units 16 to a position above and beyond the double hinges 32 and swinging the panels 31 into line with the panels 18. The catwalks 8 are then tilted upwardly and the adjustable posts 35 inserted through the holes 24 in the catwalks until the catwalks rest upon the flanges 40 on the posts 35. The catwalks and the posts are then swung downwardly until the end edges of the catwalks rest upon the sealing flanges or lips 22 of the panels 18. The posts 35 are then adjusted so that they also aid in supporting the catwalks. The double hinges 32 with attached panels 31 are next swung inwardly so that one part of each hinge rests upon the ledge of the adjacent catwalk which will cause the panels 31 to be positioned slightly offset from the panels 18 but in alignment with the grooves 33 in the panels 27. Next the supporting posts 34 are positioned alongside the outer edges of the panels 31 and the ladders 42 placed in position against the catwalks 8. Adjustment of the panels 27 follows next until they are in alignment with the long sections 26 of the roof units 16. Each roof unit 16 is next lowered so that the upper edges of panels 31 become nested in the grooves 33 of panels 27. The lugs 37 on posts 34 are then interlocked with the roof panels 27. Finally the canvas skirts 43 and side flaps 44 are laid out and then attached to the bulkheads. The side flaps 44 may be left hanging down and attached to the skirts 43 by the zipper elements 49 and 50 so that the space below the truck body is enclosed at all times. If desired, however, the flaps 44 may be raised and supported by the posts 54 and guy ropes 55 as shown in Figure 5. The rear doors 12 may be opened if desired and a ladder positioned in place against the catwalk.

The modification of the invention illustrated in Figures 32 to 34, inclusive, differs from the form of the invention shown in Figures 1 to 31, inclusive, in that the roof units or sections 16′ are hinged to the ridge member 4′ along a single line at its center. In this form of the invention, the roof units 16′ are provided with a series of tubular hinge lugs or knuckles 57 forming extensions of the roof panels or sections 25′ and being adapted to be fastened to coacting tubular hinge lugs or knuckles 58 on the ridge member by a hinge pin 59. The hinge knuckles are so arranged that they are positioned in the space between the roof units as shown in Figure 32. This single hinge construction permits the roof units 16′ to be pivoted around the hinge line and to be swung upwardly and toward each other to bring their panels or sections 25′ into abutting relation. When the roof units are in such abutting relation and the hinge pin removed, the hook elements 60 of a lifting hoist 61 or the like can readily be fastened to the outermost end edges of the units and the units lifted off of and clear of the truck body as shown in Figure 33, so that the entire interior of the truck body is exposed permitting loading and unloading of the contents from the top of the truck body.

In all other respects the form of the invention shown in Figures 32 to 34, inclusive, is similar to the form shown in Figures 1 to 31, inclusive, and similar reference numerals are used to indicate similar parts.

While the preferred embodiments of the invention have been illustrated and described, it will be understood that changes in details might be made without departing from the scope of the invention.

What I claim is:

1. An expansible building structure comprising an elongated rigid floor, a floor-extension panel hinged to each long side edge of said floor and normally extending upwardly at right angles thereto and being adapted to be moved into alignment with the floor, bulkheads fixed to and extending upwardly from the ends of said floor, a pair of roof panels each having a short section and a long section right angularly related to said short section, each short section being connected at its free edge to said bulkheads to swing on a horizontal axis extending longitudinally of said rigid floor intermediate the width thereof, main bulkhead-extension panels hinged to the side edges of said bulkheads and being normally disposed lengthwise of said building structure, roof extension panels hinged to the outer edges of the long sections of said roof panels and being normally folded inside said long sections, said floor-extension panels, said main bulkhead-extension panels and said long sections of the roof panels, with their folded roof-extension panels constituting the side walls of the building structure when the latter is in folded normal condition, said floor-extension panels being extendable into alignment with the floor, said roof panels being swingable upwardly, said bulkhead-extension panels being swingable into alignment with said bulkheads and said roof-extension panels being adapted to be swung outwardly into vertical position to form the sides of the building structure in expanded condition or to be extended into alignment with said long sections of the roof panels to form prolongations thereof in super-expanded condition of the structure, the angular relation of said short and long sections of the roof panels providing headroom in the building structure when the latter is in both expanded and super-expanded conditions, means for supporting said roof panels and said floor extension panels in expanded condition.

2. An expansible building structure as defined in claim 1 with the addition of an auxiliary bulkhead-extension panel hingedly connected to the vertical free edge of each of said main bulkhead-extension panels and adapted to be disposed in alignment with their respective main bulkhead panel sections and in close proximity to the corresponding roof-extension panels when the building structure is in normal folded condition, said auxiliary bulkhead-extension panels being also extendable into alignment with their corresponding main bulkhead-extension panels and their respective bulkheads and with their upper edges underlying the corresponding roof-extension panels when the building structure is in super-expanded condition, and means for supporting said roof-extension panels in super-expanded condition.

3. An expansible building structure comprising an elongated rigid floor, a floor-extension panel hinged to each long edge of said floor normally extending upwardly at right angles thereto and being adapted to be moved into alignment with the floor, bulkheads fixed to and extending upwardly from the ends of said floor, a ridge member connecting the tops of said bulkheads, two parallel rows of hinge elements secured to the upper side of the ridge member and extending longitudinally thereof inwardly of the longitudinal edges thereof, roof panels each having right angularly related short and long sections, each short section carrying hinge elements hinged to the hinge elements of one row of hinge elements on the ridge member with said short sections overlying the ridge member, main bulkhead-extension panels hinged to the side edges of said bulkheads and being normally disposed lengthwise of said building structure, roof extension panels hinged to the outer edges of the long sections of said roof panels and being normally folded inside said long sections, said floor-extension panels, said main bulkhead-extension panels and said long sections of the roof panels, with their folded roof-extension panels constituting the side walls of the building structure when the latter is in folded normal condition, said floor-extension panels being extendable into alignment with the floor, said roof panels being swingable upwardly, said bulkhead-extension panels being swingable into alignment with said bulkheads and said roof-extension panels being adapted to be swung outwardly into vertical position to form the sides of the building structure in expanded condition, the angular relation of said short and long sections of the roof panels providing headroom in the building structure when the latter is in expanded condition and means for supporting said floor-extension panels and said roof panels in expanded condition.

4. An expansible building structure as defined in claim 1 wherein said roof panels have triangular end wall sections that overlap the bulkheads when the structure is in normal folded condition and which constitute extensions beyond the upper edges of the bulkheads and the bulkhead extension panels when the building structure is in expanded condition.

5. An expansible building structure as defined in claim 1 wherein said bulkhead extension panels and said roof-extension panels and the long sections of said roof panels have windows that are disposed in alignment with each other when the building structure is in normal folded condition, said windows providing for admission of light into the building structure when the structure is in both normal condition and expanded condition.

6. An expansible building structure as defined in claim 1 wherein the last named means comprises posts having two relatively longitudinally adjustable sections and means for clamping the sections in adjusted relation, said sections having collars to underlie the extended floor panels and the long sections of the extended roof panels, respectively, and wherein said floor extension panels have openings through which said posts extend.

7. A truck including a chassis mounted on wheels, an expansible truck body on said chassis including an elongated rigid floor, a pair of floor-extension panels hinged to the long side edges of said floor normally extending upwardly at right angles thereto and being adapted to be moved toward and away from the floor, bulkheads fixed to and extending upwardly from the ends of said floor, a pair of roof panels each having a short section and a long section right-angularly related to said short section, the short section being connected at its free edge to said bulkheads to swing on a horizontal axis extending longitudinally of said rigid floor intermediate the width thereof, main bulkhead-extension panels hinged to the side edges of said bulkheads and being normally disposed lengthwise of the truck body, roof-extension panels hinged to the outer edges of the long sections of the roof panels and being normally folded inside said long sections, said floor-extension panels, said bulkhead-extension panels and said long sections of the roof panels, with their folded roof-extension panels constituting the side walls of the truck body when the latter is in folded condition, said hinged floor panels being adapted to be extended into alignment with the floor, said bulkhead-extension panels being adapted to be extended into alignment with the respective bulkheads, said roof panels being swingable upwardly and said roof-extension panels being swingable into alignment with the respective long sections of said roof panels to form prolongations thereof in extended condition of the truck body and to provide an extended roof wherein the angular relation of said short and long sections of the roof panels provides head room in the truck body, said extended hinged floor panels providing work benches for operators standing on the ground that supports said truck wheels, and adjustable support means coacting with said hinged floor panels and with said roof extension panels for supporting said panels when the truck is in super-expanded position.

8. A truck as defined in claim 7 with the addition of auxiliary bulkhead-extension panels hingedly connected to and normally foldable alongside said main bulkhead-extension panels but extendable into alignment with said main bulkhead-extension panels beyond the outer edges of the extended floor-extension panels and a canvas closure separably connected to said bulkheads, said main bulkhead-extension panels, said auxiliary bulkhead-extension panels and said support means, thereby enclosing the space beneath the floor and extended floor panels and beneath the auxiliary bulkhead panels and outwardly of the longitudinal edges of said extended floor panels.

9. An expansible building structure as defined in claim 1 wherein there is a row of hinge knuckles spaced longitudinally of the free edge of each of said short sections, similar hinge knuckles connected to the bulkheads and a pintle connecting all of said hinge knuckles to provide for upward swinging of the roof sections and for bodily lifting of the roof panels from the bulkheads upon removal of said hinge pintle from the hinge knuckles on the bulkheads.

References Cited in the file of this patent

UNITED STATES PATENTS

| | | |
|---|---|---|
| 559,963 | Bierstadt | May 12, 1896 |
| 739,012 | Lehr | Sept. 15, 1903 |
| 2,155,876 | Stout | Apr. 25, 1939 |
| 2,433,158 | Reid | Dec. 23, 1947 |
| 2,569,641 | Metherell | Oct. 2, 1951 |

FOREIGN PATENTS

| | | |
|---|---|---|
| 902,131 | France | Nov. 27, 1944 |